US012673667B2

(12) United States Patent
Oosawa et al.

(10) Patent No.: US 12,673,667 B2
(45) Date of Patent: Jul. 7, 2026

(54) VEHICLE CONTROL APPARATUS

(71) Applicant: SUBARU CORPORATION, Tokyo (JP)

(72) Inventors: Jun Oosawa, Tokyo (JP); Masaki Komuro, Tokyo (JP); Tetsu Matsuzaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 343 days.

(21) Appl. No.: 18/151,024

(22) Filed: Jan. 6, 2023

(65) Prior Publication Data
US 2023/0249670 A1 Aug. 10, 2023

(30) Foreign Application Priority Data
Feb. 8, 2022 (JP) ................................. 2022-018138

(51) Int. Cl.
*B60W 20/40* (2016.01)
*B60W 10/02* (2006.01)
(Continued)

(52) U.S. Cl.
CPC .......... *B60W 20/40* (2013.01); *B60W 10/026* (2013.01); *B60W 10/06* (2013.01);
(Continued)

(58) Field of Classification Search
CPC .... B60W 20/40; B60W 10/026; B60W 10/06; B60W 10/08
See application file for complete search history.

(56) References Cited

U.S. PATENT DOCUMENTS

2004/0040375 A1* 3/2004 Kadota .................... B60K 6/00
903/902
2007/0259755 A1* 11/2007 Tanishima ............ B60W 10/02
477/3
(Continued)

FOREIGN PATENT DOCUMENTS

EP 1932704 * 10/2011 ............ B60W 20/10
EP 1932704 B1 * 10/2011 ............ B60W 20/10
(Continued)

OTHER PUBLICATIONS

S. Sasaki, "Toyota's newly developed hybrid powertrain," Proceedings of the 10th International Symposium on Power Semiconductor Devices and ICs. ISPSD'98 (IEEE Cat. No.98CH36212), Kyoto, Japan, 1998, pp. 17-22. (Year: 1998).*
(Continued)

*Primary Examiner* — Joan T Goodbody
(74) *Attorney, Agent, or Firm* — Rimon P.C.

(57) ABSTRACT
A vehicle control apparatus to be applied to a hybrid vehicle includes an electric motor, an engine, a clutch mechanism, a torque converter, and a control system. In a case of switching a traveling mode of the hybrid vehicle from a motor mode to an engine mode in response to an increase in requested driving force from a first driving force to a second driving force resulting from an operation of an accelerator of the vehicle, the control system starts up the engine and engages the clutch mechanism while controlling the electric motor based on a transition driving force larger than the first driving force. After a lapse of a delay time from completion of starting up of the engine and engaging the clutch mechanism, the control system controls the electric motor and the engine based on the second driving force larger than the transition driving force.

3 Claims, 14 Drawing Sheets

(51) Int. Cl.
   B60W 10/06 (2006.01)
   B60W 10/08 (2006.01)
(52) U.S. Cl.
   CPC ..... B60W 10/08 (2013.01); B60W 2510/0657
         (2013.01); B60W 2510/083 (2013.01); B60W
         2540/10 (2013.01); B60W 2710/023 (2013.01);
         B60W 2710/0666 (2013.01); B60W 2710/083
                                          (2013.01)

(56) References Cited

U.S. PATENT DOCUMENTS

| | | | | |
|---|---|---|---|---|
| 2013/0029805 A1* | 1/2013 | Matsuo | | B60W 10/06 |
| | | | | 903/902 |
| 2020/0361445 A1 | 11/2020 | Mochizuki et al. | | |

FOREIGN PATENT DOCUMENTS

| | | |
|---|---|---|
| JP | H08-121203 A | 5/1996 |
| JP | 2002-027611 A | 1/2002 |
| JP | 2005-138743 A | 6/2005 |
| JP | 2011-046353 A | 3/2011 |
| JP | 6154680 B2 | 6/2017 |
| WO | 2019/031278 A1 | 2/2019 |

OTHER PUBLICATIONS

A. M. Phillips, M. Jankovic and K. E. Bailey, "Vehicle system controller design for a hybrid electric vehicle," Proceedings of the 2000 . IEEE International Conference on Control Applications. Conference Proceedings (Cat. No.00CH37162), Anchorage, AK, USA, 2000, pp. 297-302. (Year: 2000).*
Y. Zhai, G. Dong, Z. Jiang, Q. Liang, X. Li and F. Wang, "Cooperative Motor Control for Dog Clutch Engagement of Electric Vehicles Based on Smith Predictor," 2020 4th CAA International Conference on Vehicular Control and Intelligence (CVCI), Hangzhou, China, 2020, pp. 221-225. (Year: 2020).*
N. Mizutani, Y. Ishida, H. Matsui, K. Yano and T. Takahashi, "Automatic driving control by robotic driver considering the lack of a driving force at changing gears," 2016 IEEE/RSJ International Conference on Intelligent Robots and Systems (IROS), Daejeon, Korea (South), 2016, pp. 3075-3080. (Year: 2016).*
S. K. Somogyi and T. Sándor, "Efficiency optimization of electric buses through transmission control," 2021 IEEE 4th International Conference and Workshop Óbuda on Electrical and Power Engineering (CANDO-EPE), Budapest, Hungary, 2021, pp. 181-186. ( Year: 2021).*
Office Action dated Oct. 7, 2025, issued in corresponding JP Application No. 2022-018138, 5 pages.

* cited by examiner

[EV MODE]

[HEV MODE]

VEHICLE CONTROL APPARATUS

CROSS-REFERENCE TO RELATED APPLICATIONS

The present application claims priority from Japanese Patent Application No. 2022-018138 filed on Feb. 8, 2022, the entire contents of which are hereby incorporated by reference.

BACKGROUND

The disclosure relates to a vehicle control apparatus to be applied to a hybrid vehicle. A hybrid vehicle includes an engine and an electric motor as power sources. For example, reference is made to Japanese Unexamined Patent Application Publication Nos. 2011-046353 and 2005-138743, and Japanese Patent No. 6154680. The hybrid vehicle has traveling modes including a motor mode and an engine mode. In the motor mode, the vehicle travels using the electric motor. In the engine mode, the vehicle travels using the engine. The engine mode allows the vehicle to travel using both the engine and the electric motor, and also allows the vehicle to travel using the engine only.

SUMMARY

An aspect of the disclosure provides a vehicle control apparatus to be applied to a hybrid vehicle. The vehicle control apparatus includes an electric motor, an engine, a clutch mechanism, a torque converter, and a control system. The electric motor is coupled to one or both of a first wheel and a second wheel of the vehicle. The engine is coupled to one or both of the first wheel and the second wheel via a power transmission path. The clutch mechanism is provided on the power transmission path. The torque converter is provided on the power transmission path. The control system includes a processor and a memory that are communicably coupled to each other. The control system is configured to control the electric motor, the engine, and the clutch mechanism. The hybrid vehicle is switchable between a motor mode and an engine mode as a traveling mode. The motor mode is a mode in which the electric motor is driven with the clutch mechanism disengaged. The engine mode is a mode in which the engine is driven with the clutch mechanism engaged. The control system is configured to, in a case of switching the traveling mode from the motor mode to the engine mode in response to an increase in requested driving force from a first driving force to a second driving force resulting from an operation of an accelerator of the vehicle, start up the engine and engage the clutch mechanism while controlling the electric motor based on a transition driving force larger than the first driving force, and control, after a lapse of a delay time from completion of starting up the engine and engaging the clutch mechanism, the electric motor and the engine based on the second driving force larger than the transition driving force.

An aspect of the disclosure provides a vehicle control apparatus to be applied to a hybrid vehicle. The vehicle control apparatus includes an electric motor, an engine, a clutch mechanism, a torque converter, and circuitry. The electric motor is coupled to one or both of a first wheel and a second wheel of the vehicle. The engine is coupled to one or both of the first wheel and the second wheel via a power transmission path. The clutch mechanism is provided on the power transmission path. The torque converter is provided on the power transmission path. The circuitry is configured to control the electric motor, the engine, and the clutch mechanism. The hybrid vehicle is switchable between a motor mode and an engine mode as a traveling mode. The motor mode is a mode in which the electric motor is driven with the clutch mechanism disengaged. The engine mode is a mode in which the engine is driven with the clutch mechanism engaged. The circuitry is configured to, in a case of switching the traveling mode from the motor mode to the engine mode in response to an increase in requested driving force from a first driving force to a second driving force resulting from an operation of an accelerator of the vehicle, start up the engine and engage the clutch mechanism while controlling the electric motor based on a transition driving force larger than the first driving force; and control, after a lapse of a delay time from completion of starting up the engine and engaging the clutch mechanism, the electric motor and the engine based on the second driving force larger than the transition driving force.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
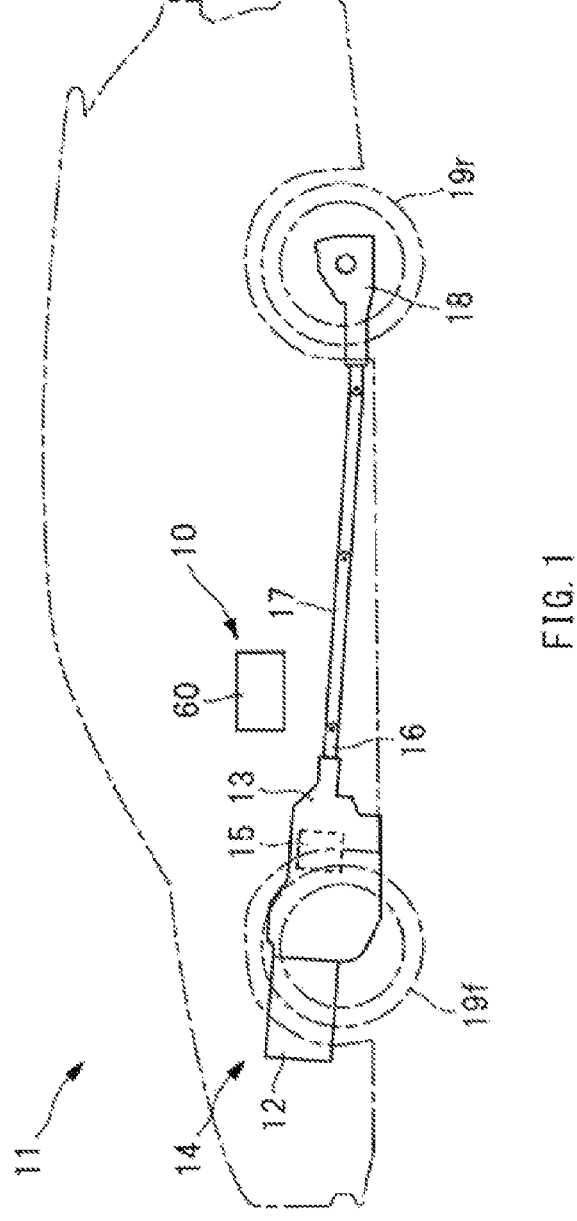
FIG. 1 is a diagram illustrating a configuration example of a hybrid vehicle including a vehicle control apparatus according to one example embodiment of the disclosure.

To switch a traveling mode of a hybrid vehicle from a motor mode to an engine mode, an engine is to be started up and a clutch which transmits an engine torque is to be engaged. This makes it difficult to immediately output the engine torque even in a case where the traveling mode is to be switched from the motor mode to the engine mode in response to an increase in target driving force resulting from pressing of an accelerator pedal. In other words, in switching the traveling mode to the engine mode, a temporary shortage of the engine torque occurs to cause an actual driving force to deviate from the target driving force, which makes it difficult to execute appropriate switching to the engine mode.

It is desirable to provide a vehicle control apparatus that makes it possible to switch a traveling mode appropriately to an engine mode.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

[Overall Configuration]

FIG. 1 illustrates a configuration example of a hybrid vehicle 11 including a vehicle control apparatus 10 according to an example embodiment of the disclosure. As illustrated in FIG. 1, the hybrid vehicle 11 may include a power train 14. The power train 14 may include an engine 12 and a transmission 13. The transmission 13 of the power train 14 may include a motor generator 15. In one embodiment, the motor generator 15 may serve as an "electric motor". The transmission 13 may include an output shaft 16. Rear wheels 19r may be coupled to the output shaft 16 via a propeller shaft 17 and a differential mechanism 18. In one embodiment, the rear wheels 19r may each serve as a "first wheel". In the example illustrated in FIG. 1, the power train 14 may be a rear-wheel drive power train which drives the rear wheels 19r. However, this is non-limiting. For example, the power train 14 may be a front-wheel drive power train which drives front wheels 19f, or may be an all-wheel drive power train which drives both the front wheels 19f and the rear wheels 19r. In one embodiment, the front wheels 19f may each serve as a "second wheel".

Figure 2:
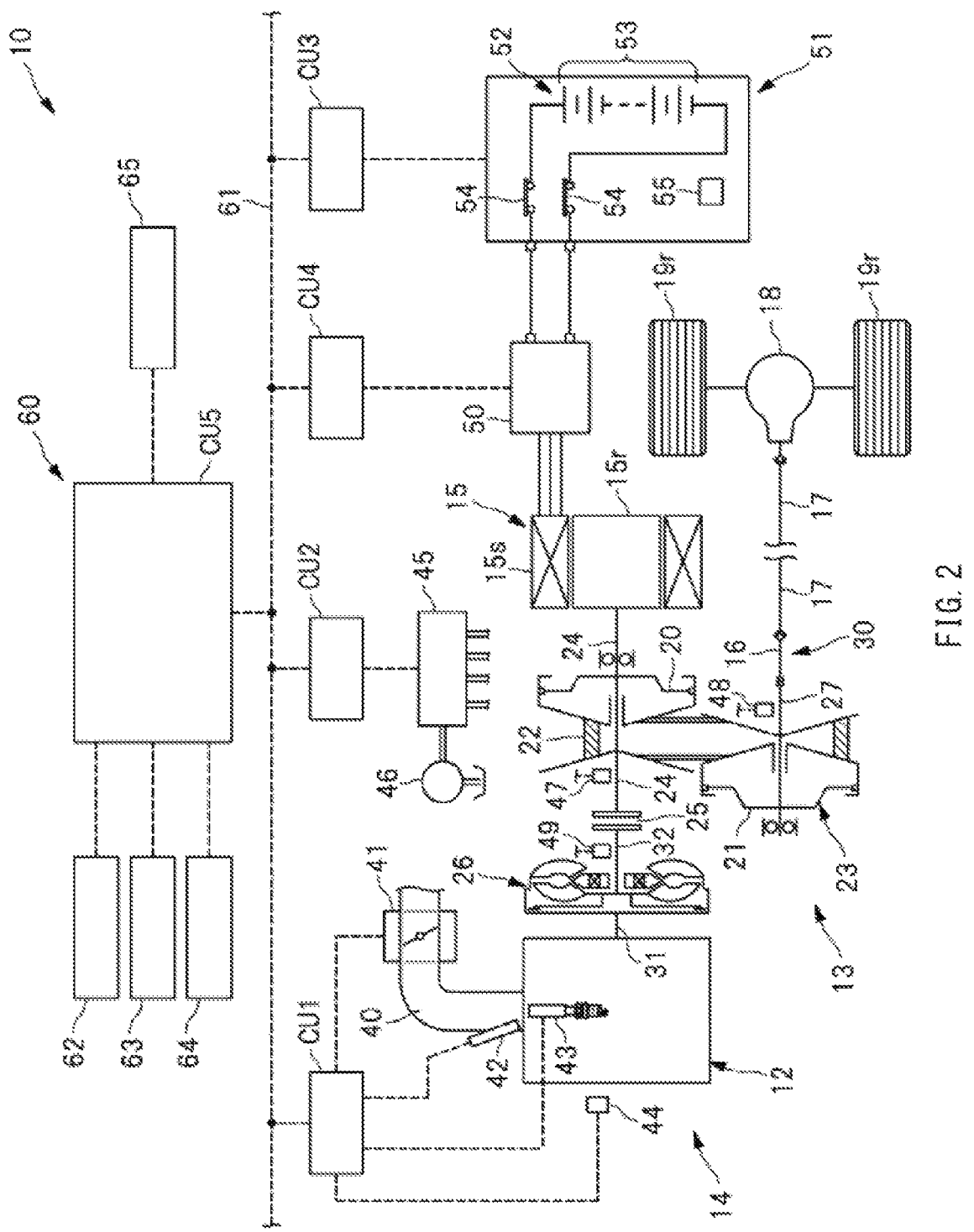
FIG. 2 is a diagram illustrating a configuration example of the vehicle control apparatus.

FIG. 2 illustrates a configuration example of the vehicle control apparatus 10. As illustrated in FIG. 2, the power train 14 may include a continuously variable transmission mechanism 23. The continuously variable transmission mechanism 23 may include a primary pulley 20, a secondary pulley 21, and a drive chain 22. The primary pulley 20 may be supported by a primary shaft 24. The engine 12 may be coupled to one side of the primary shaft 24 via a forward clutch 25 and a torque converter 26. In one embodiment, the forward clutch 25 may serve as a "clutch mechanism". The motor generator 15 may include a rotor 15r coupled to the other side of the primary shaft 24 which may support the primary pully 20. The secondary pulley 21 may be supported by a secondary shaft 27. The rear wheels 19r may be coupled to the secondary shaft 27 via the output shaft 16, the propeller shaft 17, and the differential mechanism 18. The forward clutch 25 may be a portion of a forward-backward travel changeover mechanism including, for example, a planetary gear train.

The engine 12 and the rear wheels 19r may be coupled to each other via a power transmission path 30. The power transmission path 30 may include devices including, for example, the torque converter 26, the forward clutch 25, the continuously variable transmission mechanism 23, the propeller shaft 17, and the differential mechanism 18. In the configuration example illustrated in FIG. 2, the power transmission path 30 may include a crankshaft 31, the torque converter 26, a turbine shaft 32, the forward clutch 25, the primary shaft 24, the continuously variable transmission mechanism 23, the secondary shaft 27, the output shaft 16, the propeller shaft 17, and the differential mechanism 18.

As described above, the torque converter 26 and the forward clutch 25 are provided on the power transmission path 30 that may couple the engine 12 and the rear wheels 19r to each other. The torque converter 26 may be disposed between the engine 12 and the forward clutch 25. Further, the motor generator 15 may be coupled to the primary shaft 24 included in the power transmission path 30. In other words, the motor generator 15 may be coupled to the rear wheels 19r from an input side of the continuously variable transmission mechanism 23 via the power transmission path 30.

The engine 12 may include an intake manifold 40. The intake manifold 40 may include a throttle valve 41. The throttle valve 41 may adjust an intake air amount. The engine 12 may further include an injector 42 and an ignition device 43. The injector 42 may inject a fuel into an intake port or a cylinder. The ignition device 43 may include, for example, an ignitor or an ignition plug. The engine 12 may further include an engine rotation sensor 44. The engine rotation sensor 44 may detect an engine rotation speed. The engine rotation speed may be a rotation speed of the crankshaft 31. To control a torque outputted from the engine 12, an engine control unit CU1 may be coupled to devices including, for example, the throttle valve 41, the injector 42, and the ignition device 43. The torque outputted from the engine 12 will hereinafter be referred to as an "engine torque". The engine control unit CU1 may be an electronic control unit.

To control devices in the power train 14 including, for example, the forward clutch 25 and the continuously variable transmission mechanism 23, the power train 14 may be provided with a valve unit 45. The valve unit 45 may include, for example, a plurality of electromagnetic valves and oil paths. In addition, an oil pump 46 may be coupled to the valve unit 45. The oil pump 46 may be driven by the engine 12 or the motor, for example. The valve unit 45 may control, for example, a supply destination and the pressure of hydraulic oil discharged from the oil pump 46 to thereby supply the hydraulic oil to devices including, for example, the forward clutch 25 and the continuously variable transmission mechanism 23. To control an operational state of the devices including, for example, the forward clutch 25 via the valve unit 45, a transmission control unit CU2 may be coupled to the valve unit 45. The transmission control unit CU2 may be an electronic control unit. Further, a primary rotation sensor 47 and a secondary rotation sensor 48 may be coupled to the transmission control unit CU2. The primary rotation sensor 47 may detect a primary rotation speed, and the secondary rotation sensor 48 may detect a secondary rotation speed. The primary rotation speed may be a rotation speed of the primary pulley 20. The secondary rotation speed may be a rotation speed of the secondary pulley 21. In addition, a turbine rotation sensor 49 may be coupled to the transmission control unit CU2. The turbine rotation sensor 49 may detect a turbine rotation speed. The turbine rotation speed may be a rotation speed of the turbine shaft 32.

The motor generator 15 may include a stator 15s. A battery module 51 may be coupled to the stator 15s via an inverter 50. The battery module 51 may include a plurality of battery cells 53 configuring a high-voltage battery 52. The battery module 51 may further include a main relay 54 and a battery sensor 55. The main relay 54 may control coupling of the high-voltage battery 52. The battery sensor 55 may detect, for example, a charging current, a discharging current, a terminal voltage, and a temperature of the high-voltage battery 52. In addition, a battery control unit CU3 may be coupled to the battery module 51. The battery control unit CU3 may be an electronic control unit. The battery control unit CU3 may monitor charging and discharging of the high-voltage battery 52 and control, for example, the main relay 54. Further, the battery control unit CU3 may calculate a state of charge (SOC) of the high-voltage battery 52 on the basis of factors including, for example, the charging current, the discharging current, and the terminal voltage that are detected by the battery sensor 55. Note that the SOC of the high-voltage battery 52 refers to a ratio that indicates a remaining amount of electric power stored in the high-voltage battery 52, and is defined as a ratio of an amount of electric power stored in the high-voltage battery 52 to a full charge capacity of the high-voltage battery 52.

The inverter 50 may execute energization control on the motor generator 15, and may include, for example, a plurality of switching devices. A motor control unit CU4 may be coupled to the inverter 50. The motor control unit CU4 may be an electronic control unit. The motor control unit CU4 may control the inverter 50 to thereby control a motor torque outputted from the motor generator 15. Note that examples of the motor torque of the motor generator 15 may include a powering torque and a power generation torque. The powering torque may be generated on an acceleration side by controlling the motor generator 15 to be in a powering state. The power generation torque may be generated on a deceleration side by controlling the motor generator 15 to be in a power generation state.

[Control System]

As illustrated in FIG. 2, the vehicle control apparatus 10 includes a control system 60. The control system 60 may control the power train 14, and may include a plurality of electronic control units. Examples of the electronic control units in the control system 60 may include the engine control unit CU1 the transmission control unit CU2, the battery control unit CU3, and the motor control unit CU4 which are described above. Further examples of the electronic control units in the control system 60 may include a vehicle control unit CU5. The vehicle control unit CU5 may output a control signal to each of the control units CU1 to CU4. The control units CU1 to CU5 may be communicably coupled to each other via an in-vehicle network such as a controller area network (CAN). The vehicle control unit CU5 may set an operation target of the power train 14 on the basis of data received from the control units CU1 to CU4 and various sensors to be described later. Thereafter, the vehicle control unit CU5 may generate control signals based on the operation target of the power train 14, and output the control signals to the control units CU1 to CU4.

Examples of the sensors coupled to the vehicle control unit CU5 may include a vehicle speed sensor 62, an accelerator sensor 63, and a brake sensor 64. The vehicle speed sensor 62 may detect a vehicle speed, that is, a traveling speed of the hybrid vehicle 11. The accelerator sensor 63 may detect an accelerator position, that is, an amount of an operation performed on an accelerator pedal. In one embodiment, the amount of the operation performed on the accelerator pedal may serve as an "amount of the accelerator operation" or an "amount of the operation of the accelerator". The brake sensor 64 may detect an amount of an operation performed on a brake pedal. In addition, a start switch 65 may be coupled to the vehicle control unit CU5. The start switch 65 may be operated by a driver who drives the hybrid vehicle 11 to start up the control system 60.

Figure 3:
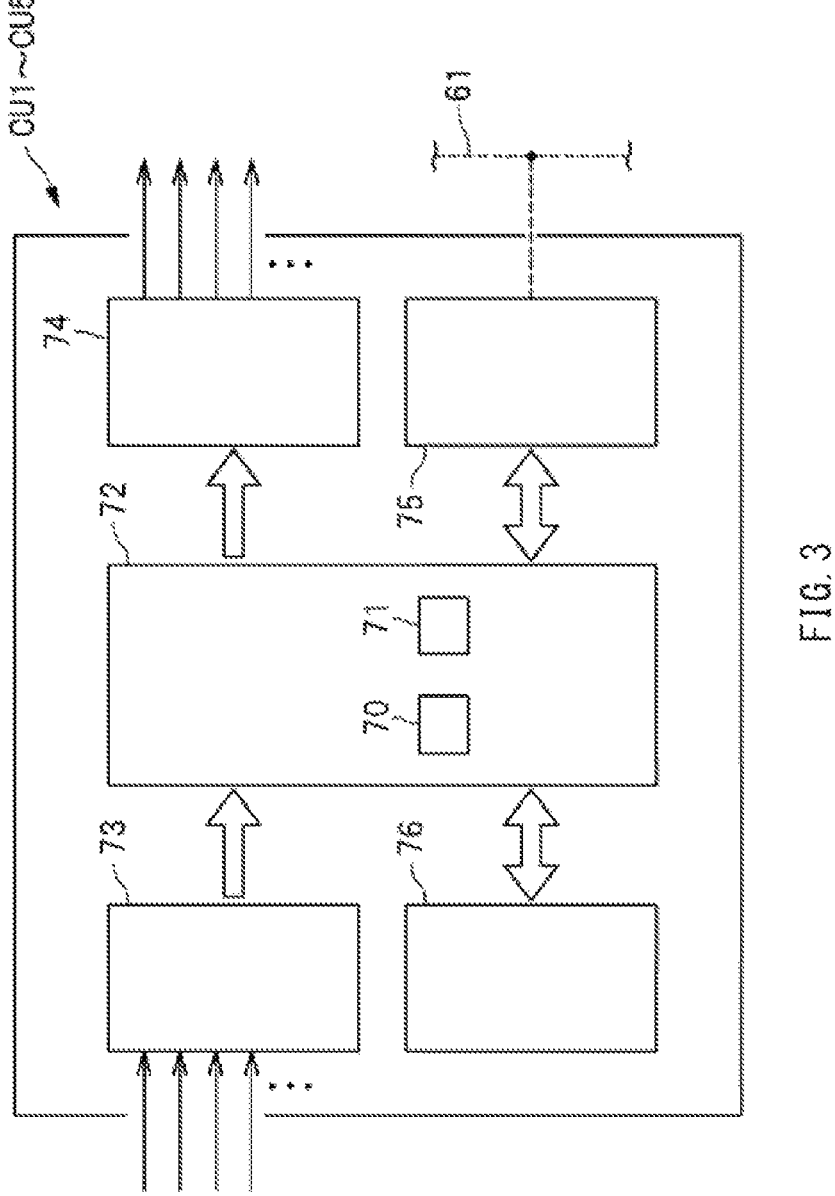
FIG. 3 is a diagram illustrating an example of a basic configuration of each control unit.

FIG. 3 illustrates an example of a basic configuration of each of the control units CU1 to CU5. As illustrated in FIG. 3, the control units CU1 to CU5 may each include a microcontroller 72 that includes devices including, for example, a processor 70 and a main memory 71. In one embodiment, the main memory 71 may serve as a "memory". The main memory 71 may hold a predetermined program. The processor 70 may execute the program. The processor 70 and the main memory 71 are communicably coupled to each other. In the example illustrated in FIG. 3, the microcontroller 72 may include one processor 70 and one main memory 71. However, this is non-limiting. The microcontroller 72 may include a plurality of processors 70. The microcontroller 72 may include a plurality of main memories 71.

The control units CU1 to CU5 may each include devices including, for example, an input circuit 73, a drive circuit 74, a communication circuit 75, and an external memory 76. The input circuit 73 may convert signals received from various sensors into signals receivable by the microcontroller 72. The drive circuit 74 may generate drive signals for driving an actuator, such as the valve unit 45 described above, on the basis of signals outputted from the microcontroller 72. The communication circuit 75 may convert the signals outputted from the microcontroller 72 into communication signals to be transmitted to the other control units. The communication circuit 75 may also convert communication signals received from the other control units into signals receivable by the microcontroller 72. Th external memory 76 may be, for example, a nonvolatile memory, and may hold a program and various pieces of data, for example.

[Traveling Mode]

Figure 4:
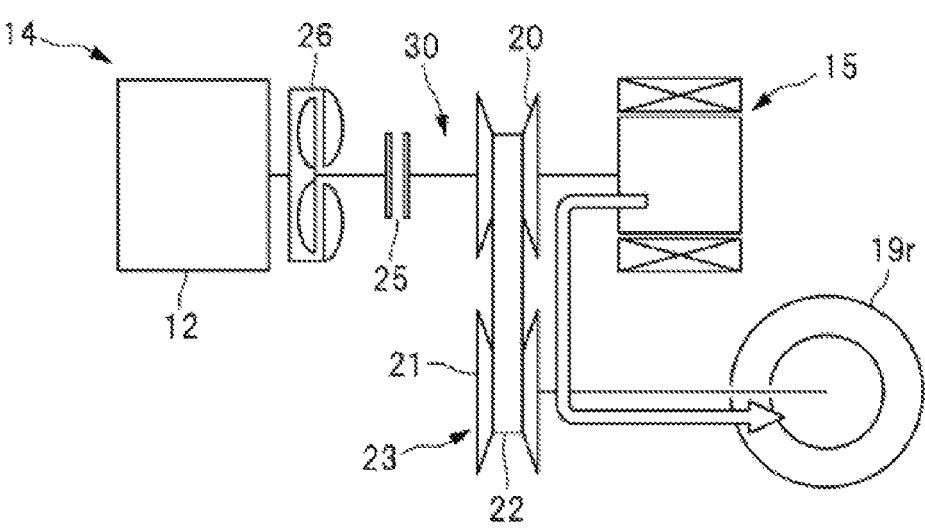
FIG. 4 is a diagram illustrating a state in which an EV mode is in execution.
Figure 5:
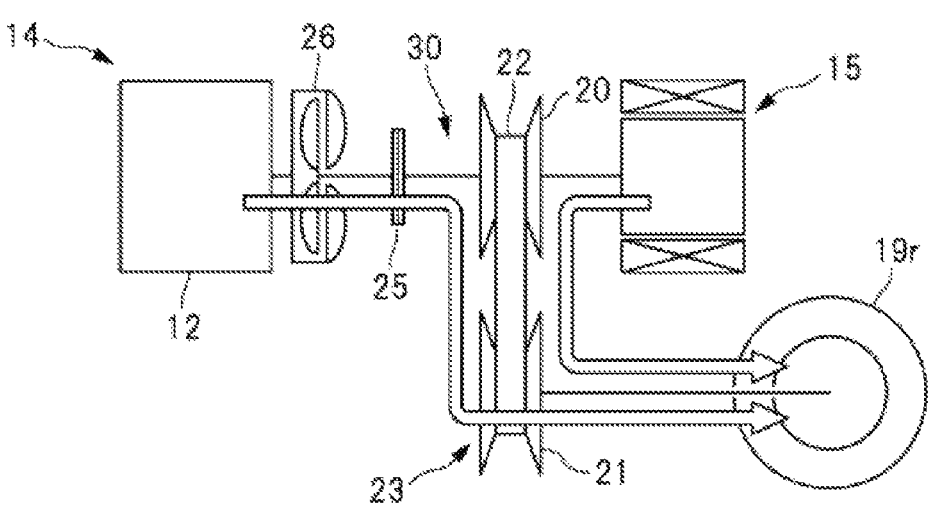
FIG. 5 is a diagram illustrating a state in which an HEV mode is in execution.

FIG. 4 illustrates a state in which an electric vehicle (EV) mode is in execution. FIG. 5 illustrates a state in which a hybrid electric vehicle (HEV) mode is in execution. The hybrid vehicle 11 is switchable between the EV mode and the HEV mode, as traveling modes. In one embodiment, the EV mode may serve as a "motor mode", and the HEV mode may serve as an "engine mode". As will be described later, the EV mode is one of the traveling modes in which the motor generator 15 is driven with the forward clutch 25 disengaged, and the HEV mode is the other of the traveling modes in which the engine 12 is driven with the forward clutch 25 engaged.

As illustrated in FIG. 4, in a case where the EV mode is executed as the traveling mode, the forward clutch 25 may be controlled to be in a disengaged state, the engine 12 may be controlled to be in a stopped state, and the motor generator 15 may be controlled to be in the powering state. This makes it possible to transmit the motor torque to the rear wheels 19r as denoted by a hollow arrow in FIG. 4, and to thereby allow the hybrid vehicle 11 to travel by means of the motor generator 15. To decelerate the hybrid vehicle 11 in the EV mode, the motor generator 15 may be controlled to be in a regeneration state, that is, in the power generation state.

As illustrated in FIG. 5, in a case where the HEV mode is executed as the traveling mode, the forward clutch 25 may be controlled to be in an engaged state, the engine 12 may be controlled to be in an operating state, and the motor generator 15 may be controlled to be in the powering state. This makes it possible to transmit the engine torque and the motor torque to the rear wheels 19*r* as denoted by hollow arrows in FIG. 5, and to thereby allow the hybrid vehicle 11 to travel by means of the engine 12 and the motor generator 15.

In an example illustrated in FIG. 5, the motor generator 15 may be controlled to be in the powering state in the HEV mode. However, this is non-limiting. The motor generator 15 may be controlled to be in an idling state or the in regeneration state. For example, in a case where the SOC of the high-voltage battery 52 is low, the motor generator 15 may be controlled to be in the idling state or in the regeneration state due to a lack of electric power to be supplied to the motor generator 15. Even in a case of causing the motor generator 15 to power in the HEV mode, the motor generator 15 may be controlled to be in the regeneration state, i.e., the power generation state, in decelerating the hybrid vehicle 11.

Figure 6:
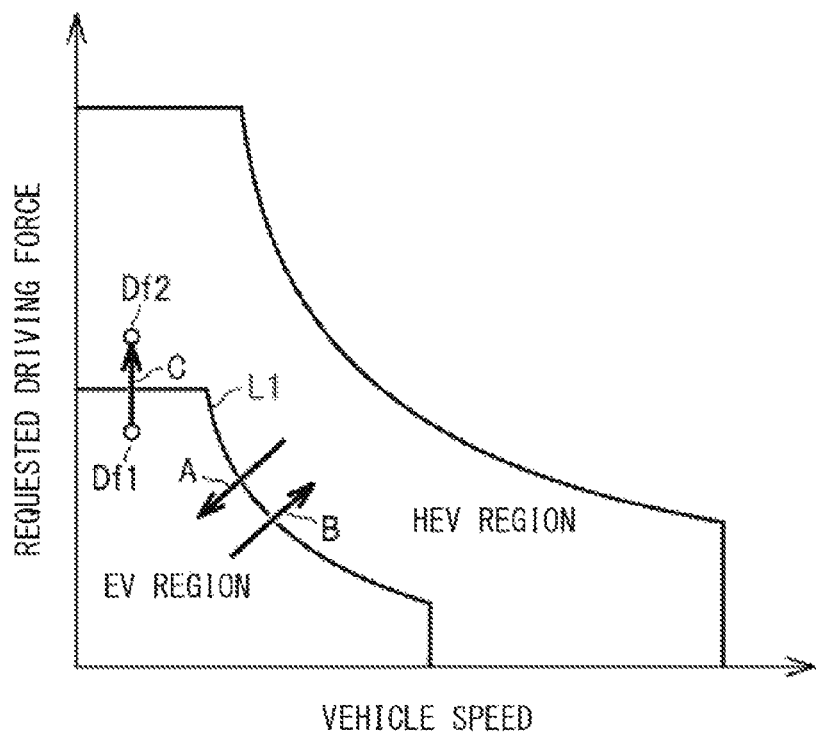
FIG. 6 is a traveling mode map illustrating an example of regions in which the EV mode and the HEV mode are to be executed.

FIG. 6 is a traveling mode map illustrating an example of regions in which the EV mode and the HEV mode are to be executed. As illustrated in FIG. 6, a boundary L1 may be set to define the respective regions in which the EV mode and the HEV mode are to be executed. FIG. 6 also illustrates a requested driving force. The requested driving force may be a driving force requested of the power train 14 by the control system 60. For example, the control system 60 may set the requested driving force on the basis of the accelerator position, i.e., the amount of the accelerator operation.

For example, the requested driving force for the hybrid vehicle 11 may be set to be larger as the accelerator position increases as a result of pressing performed on the accelerator pedal, and may be set to be smaller as the accelerator position decreases as a result of a release of the pressing performed on the accelerator pedal.

As denoted by an arrow A in FIG. 6, the traveling mode may be switched from the HEV mode to the EV mode by the control system 60 in a case where one or both of the requested driving force and the vehicle speed so decrease as to fall below the boundary L1 during execution of the HEV mode. As denoted by an arrow B in FIG. 6, the traveling mode may be switched from the EV mode to the HEV mode by the control system 60 in a case where one or both of the requested driving force and the vehicle speed so increase as to exceed the boundary L1. As used herein, the requested driving force refers to a driving force that is set on the basis of the accelerator position from the viewpoint of determining the traveling mode. As used herein, a target driving force to be described later refers to a driving force that is used in controlling the motor generator 15 and the engine 12.

[Traveling Mode Switching Control (Flowchart)]

Figure 7:
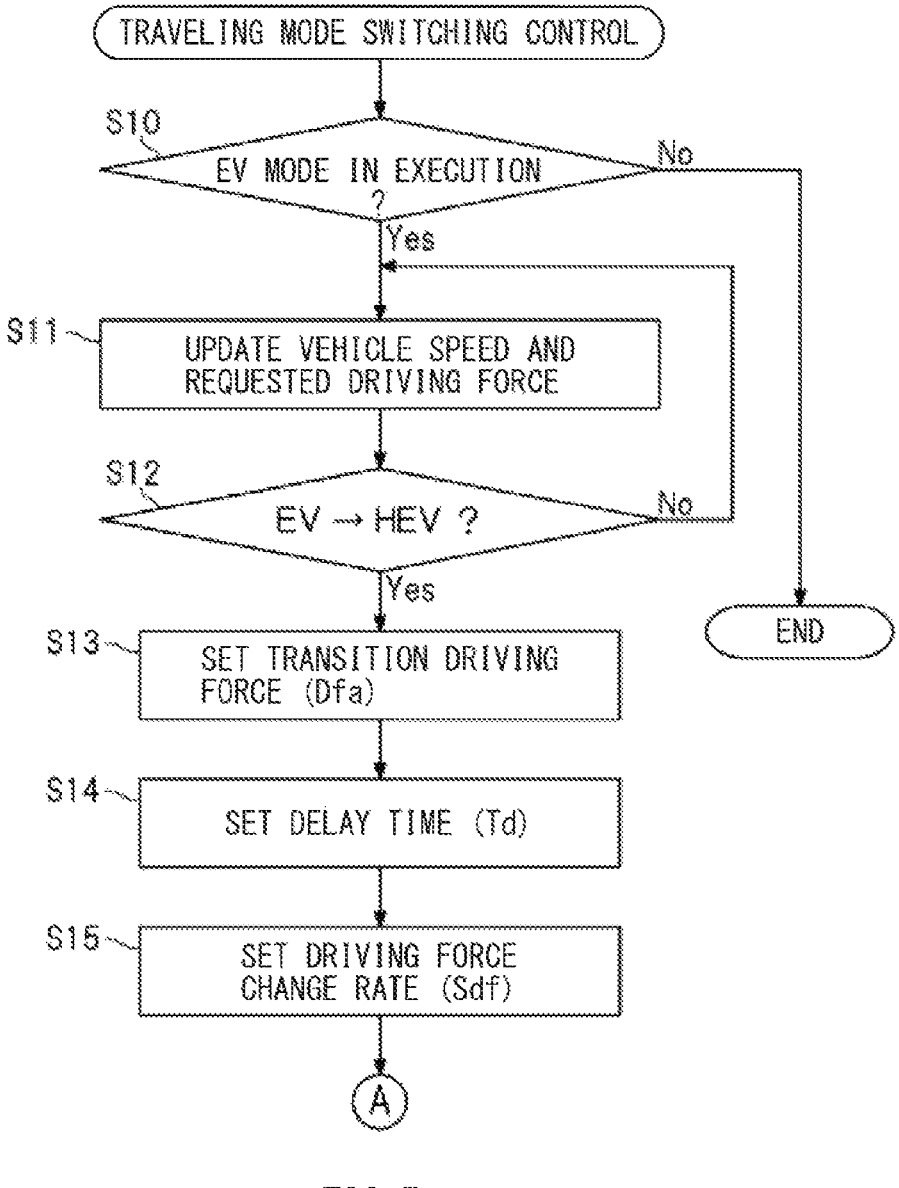
FIG. 7 is a flowchart illustrating an example of an execution procedure of traveling mode switching control.
Figure 8:
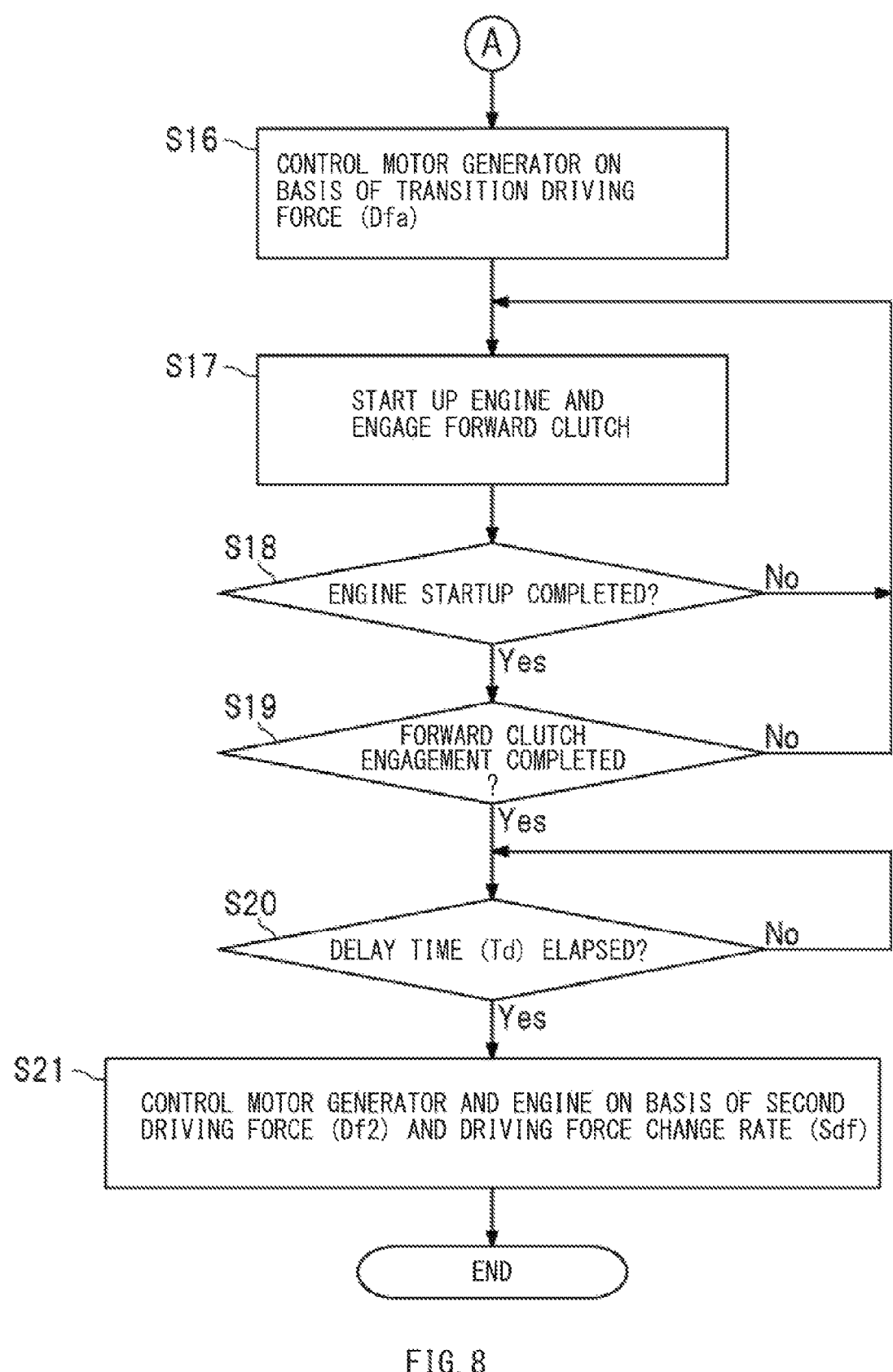
FIG. 8 is a flowchart illustrating the example of the execution procedure of the traveling mode switching control.
Figure 9:
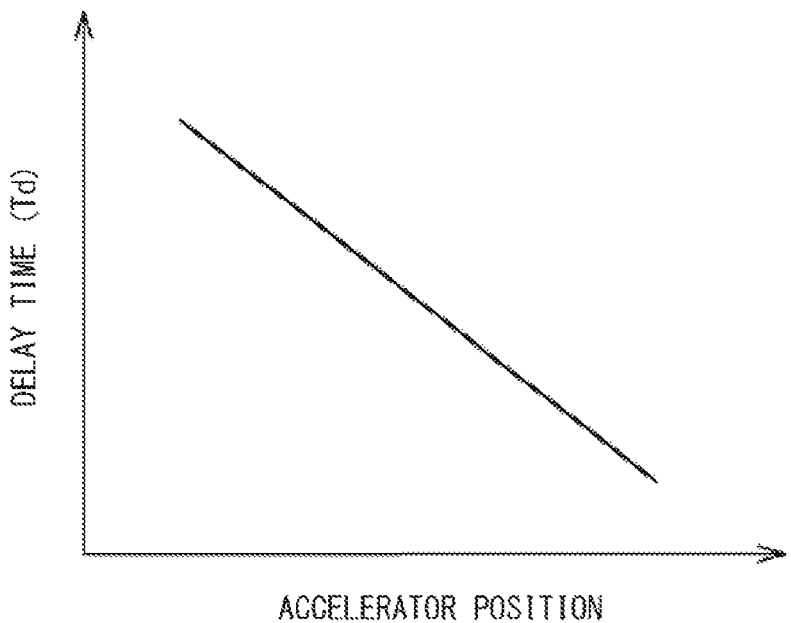
FIG. 9 is a diagram illustrating an example of a relationship between a delay time and an accelerator position.

Next, a description will be given of traveling mode switching control to be performed in a case of switching the traveling mode from the EV mode to the HEV mode. FIGS. 7 and 8 are flowcharts illustrating an example of an execution procedure of the traveling mode switching control. The flowcharts of FIGS. 7 and 8 may be coupled to each other at a point A. FIG. 9 illustrates an example of a relationship between a delay time Td and the accelerator position. FIG. illustrates an example of a relationship between a driving force change rate Sdf and the accelerator position. Each step in the flowcharts illustrated in FIGS. 7 and 8 may be performed by a processor 70 in the control system 60. The traveling mode switching control illustrated in FIGS. 7 and 8 may be executed by the control system 60 for each predetermined cycle, after the start switch 65 is operated by the driver and the control system 60 configured by the control units including, for example, the vehicle control unit CU5, is thereby started up.

As illustrated in FIG. 7, in step S10, the control system 60 may determine whether the EV mode is in execution. If the control system 60 determines in step S10 that the EV mode is in execution (step S10: Yes), the control system 60 may cause the flow to proceed to step S11 to update the vehicle speed and the requested driving force. As described above, the requested driving force may increase as the accelerator position increases, and may decrease as the accelerator position decreases. In subsequent step S12, the control system 60 may determine, on the basis of the vehicle speed and the requested driving force, whether to switch the traveling mode from the EV mode to the HEV mode. For example, if, as denoted by an arrow C in FIG. 6, the requested driving force is so increased from a first driving force Df1 to a second driving force Df2 as to exceed the boundary L1 by an accelerator operation, i.e., pressing of the accelerator pedal performed in the EV mode, the control system 60 may determine to switch the traveling mode from the EV mode to the HEV mode (step S12: Yes). In other words, the control system 60 may determine to switch the traveling mode from the EV mode to the HEV mode in response to the pressing of the accelerator pedal performed in the EV mode. In the EV mode, the target driving force may be set to the first driving force Df1. In the HEV mode, the target driving force may be set to the second driving force Df2.

Figure 10:
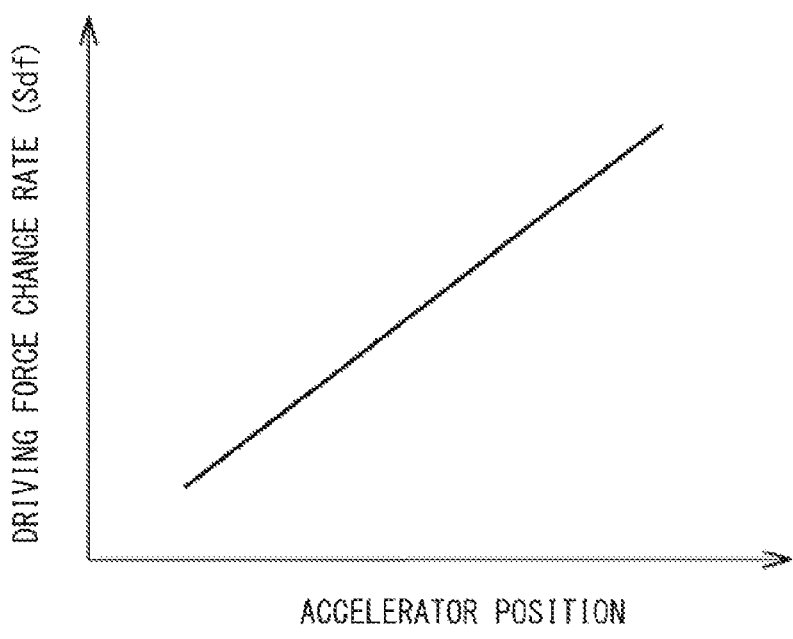
FIG. 10 is a diagram illustrating an example of a relationship between a driving force change rate and the accelerator position.

Upon determining to switch the traveling mode from the EV mode to the HEV mode in such a manner, the control system 60 may cause the flow to proceed to step S13 to set a transition driving force Dfa to be used in the process of switching the traveling mode. The transition driving force Dfa is larger than the first driving force Df1 as the target driving force in the EV mode, and smaller than the second driving force Df2 as the target driving force in the HEV mode. In step S14, on the basis of the accelerator position, the control system 60 may set the delay time Td to be used in the process of switching the traveling mode. In step S15, on the basis of the accelerator position, the control system 60 may set the driving force change rate Sdf to be used in the process of switching the traveling mode. As illustrated in FIG. 9, the control system 60 may set the delay time Td to a smaller value as the accelerator position increases. As illustrated in FIG. 10, the control system 60 may set the driving force change rate Sdf to a larger value as the accelerator position increases. In other words, the driving force change rate Sdf may be increased as the accelerator position increases.

As illustrated in FIG. 8, in step S16, the control system 60 controls the motor generator on the basis of the transition driving force Dfa. In subsequent step S17, the control system 60 starts up the engine 12 and switches the forward clutch 25 to the engaged state. Startup of the engine 12 may be performed by means of a device such as an unillustrated starter motor. Thereafter, in step S18, the control system 60 may determine whether the startup of the engine 12 has been completed. If the control system 60 determines in step S18 that the startup of the engine 12 has been completed (step S18: Yes), the control system 60 may cause the flow to proceed to step 19 to determine whether engagement of the forward clutch 25 has been completed. If the control system 60 determines in step S19 that the engagement of the forward clutch 25 has been completed (step S19: Yes), the control system 60 may cause the flow to proceed to step S20 to determine whether the delay time Td has elapsed. As to whether the startup of the engine 12 has been completed, the control system 60 may make a determination on the basis of whether the engine rotation speed exceeds a predetermined rotation speed, for example. As to whether the engagement of the forward clutch 25 has been completed, the control system 60 may make a determination on the basis of whether a difference between the turbine rotation speed and the primary rotation speed falls below a predetermined value.

If the control system 60 determines in step S20 that the delay time Td has elapsed (step S20: Yes), the control system 60 may cause the flow to proceed to step S21 to control the motor generator 15 and the engine 12 on the basis of the second driving force Df2 as the target driving force, and the driving force change rate Sdf. For example, in step S21, the control system 60 may gradually increase the target driving force from the transition driving force Dfa to the second driving force Df2 in accordance with the driving force change rate Sdf. Thereafter, the control system 60 may control the motor generator 15 and the engine 12 on the basis of the target driving force increasing toward the second driving force Df2. This makes it possible to accurately control the torque to be transmitted from the engine 12 to the primary pulley 20 via the torque converter 26, and to thereby appropriately switch the traveling mode from the EV mode to the HEV mode.

[Traveling Mode Switching Control (Timing Chart)]

Figure 11:
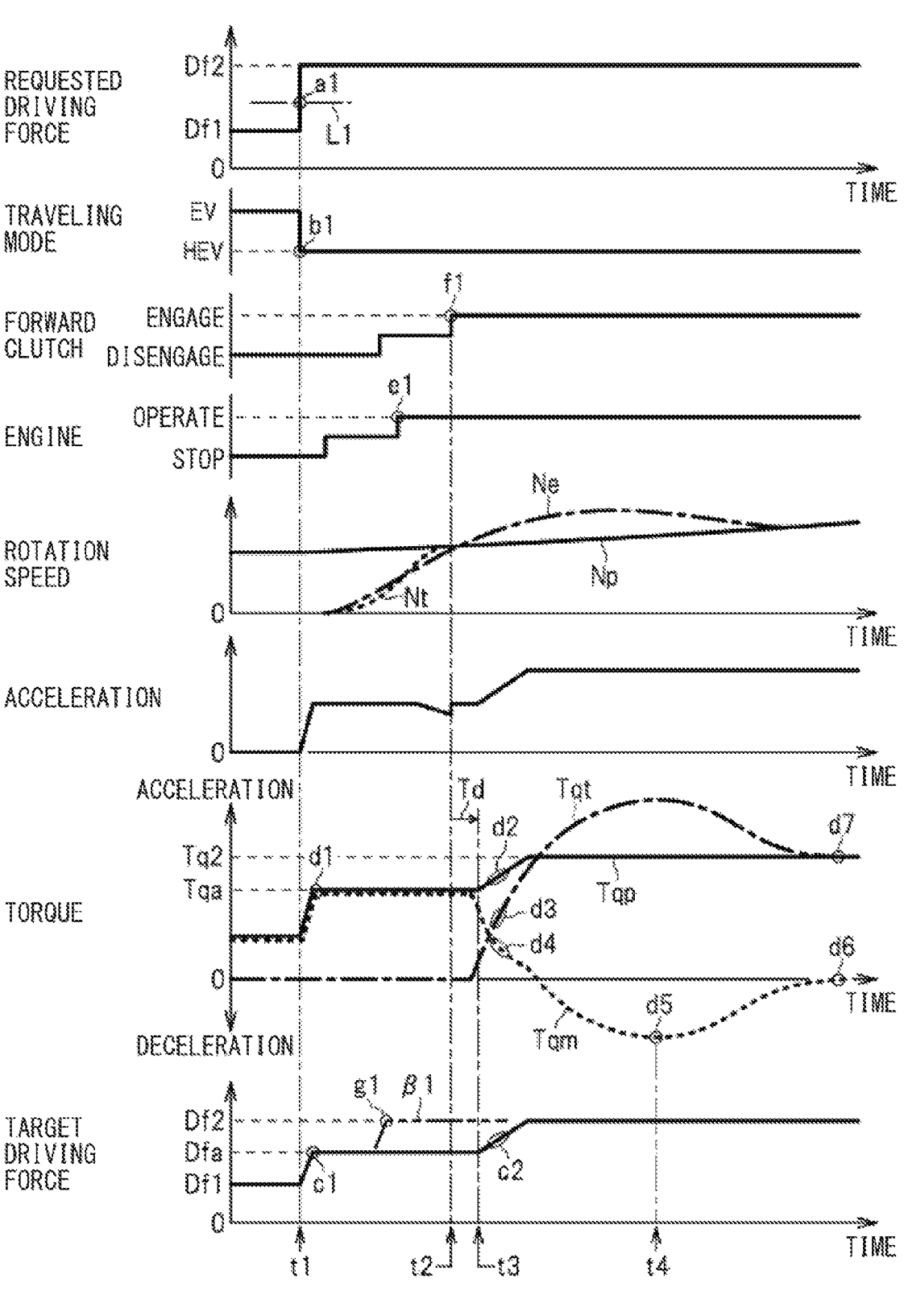
FIG. 11 is a timing chart illustrating a situation in which the traveling mode switching control is executed.
Figure 12:
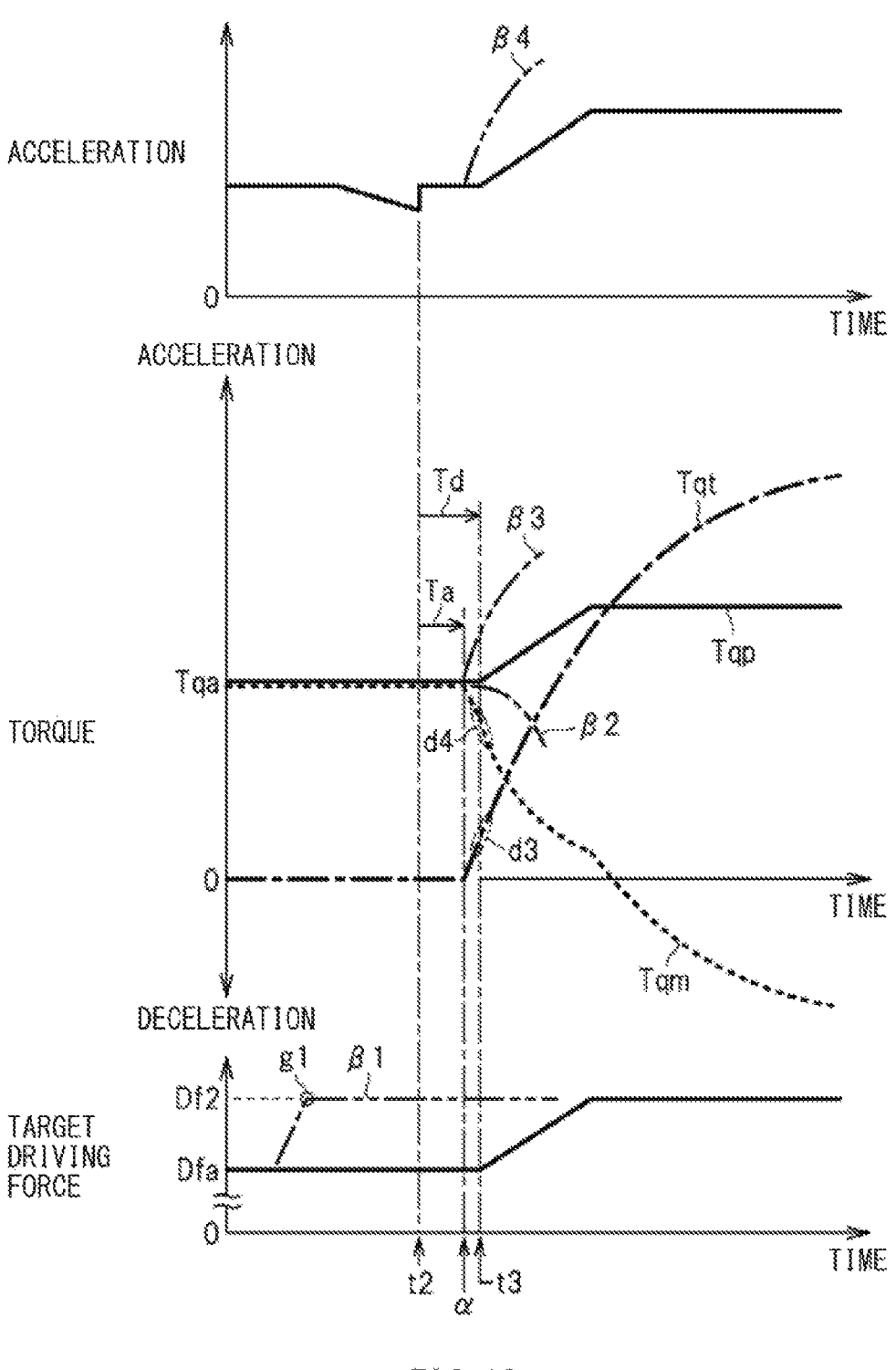
FIG. 12 is an enlarged timing chart illustrating a portion of the timing chart of FIG. 11.

Next, the foregoing traveling mode switching control will be described with reference to a timing chart. FIG. 11 is a timing chart illustrating a situation in which the traveling mode switching control is executed. FIG. 12 is an enlarged timing chart illustrating a portion of the timing chart of FIG. 11. In FIGS. 11 and 12, "Ne" represents the engine rotation speed, "Nt" represents the turbine rotation speed, and "Np" represents the primary rotation speed. "Tqt" represents a turbine torque outputted from the turbine shaft 32. "Tqm" represents the motor torque outputted from the motor generator 15. "Tqp" represents a primary torque outputted from the primary shaft 24. Note that the primary torque Tqp refers to a torque as a sum of the turbine torque Tqt and the motor torque Tqm.

As denoted by a timing t1 in FIG. 11, in a case where the requested driving force is increased to exceed the boundary L1 (denoted by a reference sign al) by pressing of the accelerator pedal during the EV mode, a determination may be made to switch the traveling mode from the EV mode to the HEV mode (denoted by a reference sign b1). When the determination is made to switch the traveling mode from the EV mode to the HEV mode (denoted by the reference sign b1), the target driving force may be increased from the first driving force Df1 to the transition driving force Dfa (denoted by a reference sign c1), and the motor torque Tqm may be controlled toward a target torque Tqa (denoted by a reference sign d1) corresponding to the transition driving force Dfa. In other words, because the motor torque Tqm may be controlled toward the target torque Tqa, the primary torque Tqp may be increased toward the target torque Tqa (denoted by the reference sign d1). Further, when the determination is made to switch the traveling mode from the EV mode to the HEV mode (denoted by the reference sign b1), the engine 12 is started up to be controlled into the operating state (denoted by a reference sign el), and the forward clutch 25 is controlled into the engaged state (denoted by a reference sign f1). In such a manner, when the determination is made to switch the traveling mode from the EV mode to the HEV mode, the control system 60 starts up the engine 12 and engages the forward clutch 25 while controlling the motor generator 15 on the basis of the transition driving force Dfa larger than the first driving force Df1.

As denoted by timings t2 and t3 in FIG. 11, the control of the motor generator 15 based on the transition driving force Dfa is continued until the delay time Td elapses from completion of the startup of the engine and the engagement of the forward clutch. Thereafter, upon lapse of the delay time Td from the completion of the startup of the engine and the engagement of the forward clutch as denoted by the timing t3, the target driving force may be increased from the transition driving force Dfa toward the second driving force Df2 (denoted by a reference sign c2), and the primary torque Tqp may be controlled toward a target torque Tq2 (denoted by a reference sign d2) corresponding to the second driving force Df2. The switching from the EV mode to the HEV mode may thus be completed. In the illustrated example, the primary torque Tqp may be increased toward the target torque Tq2 (denoted by the reference sign d2) by decreasing the motor torque Tqm (denoted by a reference sign d4) while increasing the turbine torque Tqt (denoted by a reference sign d3).

Thereafter, as denoted by a timing t4, the motor torque Tqm may be controlled to be on a power generation side, i.e., the deceleration side (denoted by a reference sign d5) to cancel out a rise in the turbine torque Tqt caused by an increase in the rotation speed of the engine 12. This makes it possible to keep the primary torque Tqp at the target torque Tq2 even in a case where the turbine torque Tqt greatly increases. In the illustrated example, the motor generator 15 may be caused to run idle in the HEV mode to thereby control the motor torque Tqm toward zero (denoted by a reference sign d6) and control the turbine torque Tqt toward the target torque Tq2 (denoted by a reference sign d7).

As described above, in the case of switching the traveling mode from the EV mode to the HEV mode, the control system 60 starts up the engine 12 and engages the forward clutch 25 while controlling the motor generator 15 on the basis of the transition driving force Dfa larger than the first driving force Df1. Further, after the lapse of the delay time Td from the completion of the startup of the engine 12 and the engagement of the forward clutch 25, the control system 60 controls the motor generator 15 and the engine 12 on the basis of the second driving force Df2 larger than the transition driving force Dfa. In such a manner, the lapse of the delay time Td may be awaited to raise the turbine torque Tqt before increasing the target driving force to the second driving force Df2. This makes it possible to accurately control the turbine torque Tqt, and to thereby appropriately switch the traveling mode without giving a sense of discomfort to the driver.

As denoted by the timing t2 in FIG. 12, at a timing immediately after the completion of the startup of the engine and the engagement of the forward clutch, it is difficult to accurately control the turbine torque Tqt by increasing or decreasing the engine torque. For example, a slip can occur in the torque converter 26 transmitting the engine torque. Accordingly, to allow an increase or decrease in the engine torque to be reflected in the turbine torque Tqt, a lapse of a predetermined time Ta is to be awaited, as denoted by a timing a. Thus, the delay time Td described above may be set to exceed the predetermined time Ta in order to ensure a situation where the turbine torque Tqt has risen, that is, a situation where the engine torque has been transmitted to the turbine shaft 32. This make it possible for the target driving force to be increased after the turbine torque Tqt is raised. Accordingly, it is possible to enhance the accuracy of control of the turbine torque Tqt by the engine 12 and to appropriately switch the traveling mode to the HEV mode. In other words, it is possible for the target driving force to be so set as not to exceed a driving force that the power train 14 is able to output. This makes it possible to control the driving force of the power grain 14 without giving a sense of discomfort to the driver.

As described above, the delay time Td may be set to be shorter as the accelerator position increases. This makes it possible to make earlier a timing of raising the target driving force denoted by the timing t3, and to thereby quickly accelerate the hybrid vehicle 11, in a case where the accelerator pedal is pressed largely, that is, in a case where the driver requests high acceleration. Further, as described above, the driving force change rate Sdf, i.e., a rate at which the target driving force increases, may be increased as the accelerator position increases. This makes it possible to quickly increase the target driving force from the transition driving force Dfa to the second driving force Dfa and to thereby quickly accelerate the hybrid vehicle 11 in the case where the accelerator pedal is pressed largely.

Next, a description will be given of responsiveness of the motor generator 15. As described above, the control of the motor generator 15 based on the transition driving force Dfa may be continued until the delay time Td elapses from the completion of the startup of the engine and the engagement of the forward clutch. This makes it possible, as denoted by the timing a in FIG. 12, to decrease the motor torque Tqm with high responsiveness in accordance with the increase in the turbine torque Tqt (denoted by the reference signs d3 and d4), and to thereby suppress an excessive variation in the primary torque Tqp. In other words, it is possible to control the primary torque Tqp toward the target driving force without giving to the driver a sense of discomfort caused by an excessive torque variation.

For example, suppose that the target driving force is increased to the second driving force Df2 without awaiting the lapse of the delay time Td, as denoted by a reference sign g1 in FIG. 11. In such a case, depending on the specification of the motor generator 15, there is a possibility that the target torque of the motor generator 15 exceeds an upper-limit torque of the motor generator 15. If a target torque exceeding the upper-limit torque of the motor generator 15 is set as in such a case, the motor torque Tqm will fall below the target torque to make it difficult to increase an actual driving force to the second driving force Dfs, i.e., the target driving force. In such a situation, deviations of the actual driving force from the target driving force can excessively accumulate to affect the torque control of the motor generator 15. For example, in a case where motor torque control is performed using proportional-integral-differential (PID) control which includes integral control, the excessive accumulation of the deviations of the actual driving force from the target driving force can degrade the responsiveness of the motor generator 15.

To cope with this, the transition driving force Dfa in the example embodiment may be set to a driving force that is obtainable in a case where the motor generator 15 is controlled to be in the powering state with the upper-limit torque. In other words, the target torque Tqa corresponding to the transition driving force Dfa may be set to the upper-limit torque that the motor generator 15 is able to output. Thereafter, when the determination is made to switch the traveling mode from the EV mode to the HEV mode, the target driving force may be increased from the first driving force Df1 to the transition driving force Dfa. This makes it possible to obtain the transition driving force Dfa as the target driving force with the motor generator 15. Accordingly, it is possible to quickly decrease the motor torque Tqm at the timing denoted by α in FIG. 12, without causing the excessive accumulation of deviations of the actual driving force from the target driving force. For example, at the timing denoted by α, the turbine torque Tqt quickly increases due to the startup of the engine; however, it is possible to decrease the motor torque Tqm with high responsiveness in accordance with the increase in the turbine torque Tqt.

For example, in the case where the target driving force is increased to the second driving force Df2 before the lapse of the delay time Td as denoted by a chain double-dashed line β1 in FIG. 12, deviations of the actual driving force from the target driving force can excessively accumulate. As a result, at the timing t3, the decrease in the motor torque Tqm can be delayed as denoted by a chain double-dashed line β2, and the primary torque Tqp can sharply increase as denoted by a chain double-dashed line β3. In such a case, as denoted by a chain double-dashed line β4, a vehicle acceleration can excessively increase and a large jerk can occur. Thus. the switching of the traveling mode can give a sense of discomfort to the driver. However, keeping the target driving force at the transition driving force Dfa helps to suppress an excessive increase in the primary torque Tqp.

In the foregoing description, the transition driving force Dfa may be set to a driving force that is obtainable in the case where the motor generator 15 is controlled to be in the powering state with the upper-limit torque. However, this is non-limiting. For example, the transition driving force Dfa may be set to be less than the driving force that is obtainable in the case where the motor generator 15 is controlled to be in the powering state with the upper-limit torque. Even in a case where the transition driving force Dfa is set to a small value in such a manner, it is possible to eliminate a deviation of the actual driving force from the target driving force occurring upon switching of the traveling mode. Accordingly, it is possible to appropriately control the motor generator 15.

[Power Trains in Other Example Embodiments]

Figure 13:
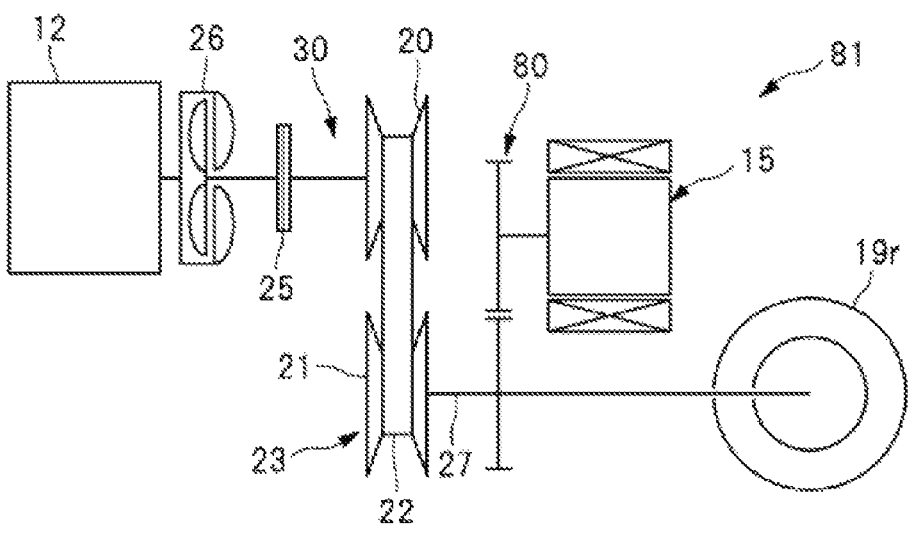
FIG. 13 is a diagram illustrating another configuration example of a power train.
Figure 14:
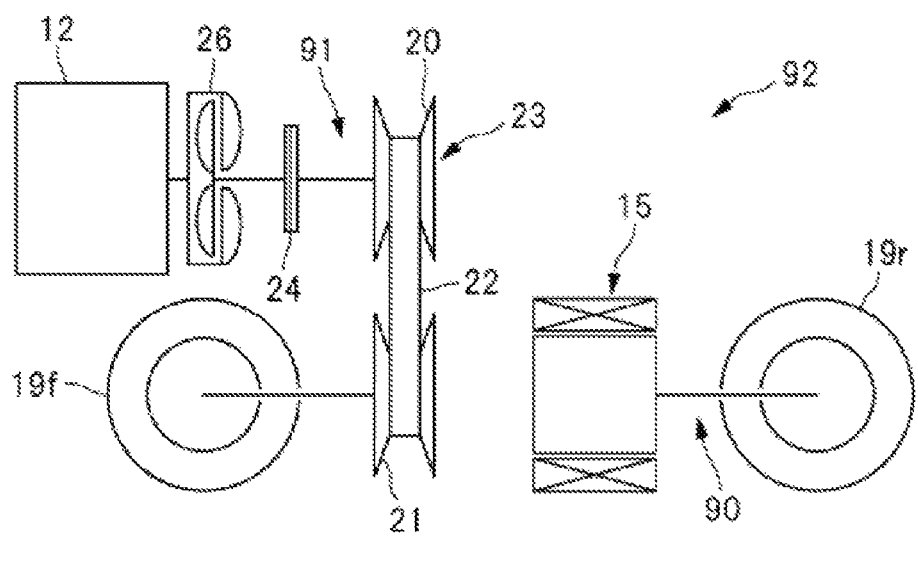
FIG. 14 is a diagram illustrating another configuration example of the power train.

The power train 14 illustrated in FIG. 2 may couple the engine 12 and the motor generator to the rear wheels 19r. However, this is non-limiting. The engine 12 may be coupled to the front wheels 19f or the rear wheels 19r, or to both the front wheels 19f and the rear wheels 19r. The motor generator 15 may be coupled to the front wheels 19f or the rear wheels 19r, or to both the front wheels 19f and the rear wheels 19r. FIGS. 13 and 14 illustrate other configuration examples of the power train.

FIG. 13 illustrates a power train 81. As illustrated in FIG. 13, the engine 12 and the rear wheels 19r may be coupled to each other via the power transmission path 30. The power transmission path 30 may be configured by, for example, a rotary shaft. The torque converter 26 and the forward clutch 25 are provided on the power transmission path 30 that may couple the engine 12 and the rear wheels 19r to each other. The motor generator 15 may be coupled to the secondary shaft 27 included in the power transmission path 30 via a gear train 80. In other words, the motor generator 15 may be coupled to the rear wheels 19r from an output side of the continuously variable transmission mechanism 23 via the power transmission path 30. A vehicle control apparatus that controls such a power train 81 is operable similarly to the vehicle control apparatus 10 described above. In the example illustrated in FIG. 13, the engine 12 and the motor generator 15 may be coupled to the rear wheels 19*r*. However, this is non-limiting. For example, the engine 12 and the motor generator 15 may be coupled to the front wheels 19*f*, or to both the front wheels 19*f* and the rear wheels 19*r*.

FIG. 14 illustrates a power train 92. As illustrated in FIG. 14, the motor generator 15 may be coupled to the rear wheels 19*r* via a power transmission path 90. The engine 12 may be coupled to the front wheels 19*f* via a power transmission path 91. The power transmission path 91 may be configured by, for example, a rotary shaft. The torque converter 26 and the forward clutch 25 are provided on the power transmission path 91 that may couple the engine 12 and the front wheels 19*f* to each other. Thus, in the illustrated power train 92, the engine 12 may be coupled to the front wheels 19*f*, and the motor generator 15 may be coupled to the rear wheels 19*r*. A vehicle control apparatus that controls such a power train 92 is operable similarly to the vehicle control apparatus 10 described above. As an alternative configuration, the engine 12 may be coupled to the rear wheels 19*r*, and the motor generator 15 may be coupled to the front wheels 19*f*.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the foregoing description, the control system 60 may be configured by the plurality of control units CU1 to CU5. However, this is non-limiting. For example, the control system 60 may be configured by a single control unit. Further, although the illustrated power train 14 may include the continuously variable transmission mechanism 23 including the two pulleys 20 and 21, this is non-limiting. For example, the power train may include a planetary gear automatic transmission mechanism, or may include no transmission mechanism. The forward clutch 25 may be a frictional clutch or a claw clutch. The motor generator 15 may be a so-called in-wheel motor provided at the front wheel 19*f* or the rear wheel 19*r*.

In the example illustrated in FIG. 9, the delay time Td may be changed continuously in accordance with the accelerator position. However, this is non-limiting. The delay time Td may be changed stepwise in accordance with the accelerator position. In the foregoing description, the delay time Td may be changed on the basis of the accelerator position. However, this is non-limiting. The delay time Td may have a preset, fixed value. In the example illustrated in FIG. 10, the driving force change rate Sdf may be changed continuously in accordance with the accelerator position. However, this is non-limiting. The driving force change rate Sdf may be changed stepwise in accordance with the accelerator position. In the foregoing description, the driving force change rate Sdf may be changed on the basis of the accelerator position. However, this is non-limiting. The driving force change rate Sdf may have a preset, fixed value.

In an example illustrated in FIG. 12, the motor torque Tqm may be decreased at the timing a. However, this is non-limiting. Depending on the magnitude of the target driving force, the motor torque Tqm may be maintained or increased. In an example illustrated in FIG. 11, in switching the traveling mode from the EV mode to the HEV mode, the engagement of the forward clutch 25 may be started after the startup of the engine 12 is started. However, this is non-limiting. The startup of the engine 12 may be started after the engagement of the forward clutch 25 is started, or the engagement of the forward clutch 25 and the startup of the engine 12 may be started simultaneously. In the example illustrated in FIG. 11, the engagement of the forward clutch 25 may be completed after the startup of the engine 12 is completed. However, this is non-limiting. The startup of the engine 12 may be completed after the engagement of the forward clutch 25 is completed, or the startup of the engine 12 and the engagement of the forward clutch 25 may be completed simultaneously. In the illustrated example, the motor generator 15 may be directly coupled to the primary shaft 24. However, this is non-limiting. The motor generator 15 may be coupled to the primary shaft 24 via the clutch mechanism. This makes it possible, in a case where the SOC of the high-voltage battery 52 is low in the HEV mode, to disengage the clutch mechanism to thereby cause the motor generator 15 to stop rotating.

The control system 60 illustrated in FIGS. 1 and 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control system 60. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control system 60 illustrated in FIGS. 1 and 2.

The invention claimed is:

1. A vehicle control apparatus to be applied to a hybrid vehicle, the vehicle control apparatus comprising:

an electric motor coupled to one or both of a first wheel and a second wheel of the vehicle;

an engine coupled to one or both of the first wheel and the second wheel via a power transmission path;

a clutch mechanism provided on the power transmission path;

a torque converter provided on the power transmission path, wherein the torque converter is disposed between the engine and the clutch mechanism; and a control system comprising a processor and a memory that are communicably coupled to each other, the control system being configured to control the electric motor, the engine, and the clutch mechanism, wherein the control system is configured to:

switch a traveling mode of the hybrid vehicle between a motor mode, in which the electric motor is driven while the clutch mechanism is disengaged, and an engine mode, in which at least the engine is driven while the clutch mechanism is engaged;

determine a requested driving force based on an amount of an operation of an accelerator of the hybrid vehicle;

determine a threshold for comparison with the requested driving force based on a vehicle speed of the vehicle;

when the traveling mode of the hybrid vehicle is the motor mode and the requested driving force is a first driving force that is equal to or less than the threshold, control the electric motor to output the first driving force;

in response to an increase in the requested driving force in the motor mode, from the first driving force to a second driving force, determine to switch the traveling mode from the motor mode to the engine mode, the second driving force being greater than the threshold;

in response to determining to switch the traveling mode from the motor mode to the engine mode, start execution of (i) a first control to cause the electric motor to output a third driving force that is greater than the threshold and smaller than the second driving force, (ii) a second control to start the engine, and (iii) a third control to engage the clutch mechanism that is released;

after starting execution of the second control, determine whether starting of the engine is completed based on a rotational speed of the engine;

after starting execution of the third control, determine whether engagement of the clutch mechanism is completed based on a difference between a rotational speed of an input shaft of the clutch mechanism and a rotational speed of an output shaft of the clutch mechanism;

in response to (i) determining that the starting of the engine is completed and (ii) determining that the engagement of the clutch mechanism is completed, determine whether a delay time has elapsed from a first timing at which (i) the determining that the starting of the engine is completed and (ii) the determining that the engagement of the clutch mechanism is completed are made;

maintain execution of the first control from starting execution of the first control until a second timing at which determining that the delay time has elapsed from the first timing is made;

after the second timing, terminate the first control and start execution of a fourth control to control the electric motor and the engine such that a combined driving force that is a sum of a driving force output by the electric motor and a driving force output by the engine increases toward the second driving force at a driving force change rate; and terminate the fourth control and start execution of a fifth control to control the electric motor and the engine such that the combined driving force follows the requested driving force, wherein the control system is configured to determine the delay time such that (i) that the delay time exceeds a predetermined time to allow an increase or decrease in an engine torque to be reflected in a turbine torque of the torque converter, and (ii) that the delay time becomes shorter as the amount of the operation of the accelerator at a third timing becomes greater, the third timing being a timing at which the determining to switch the traveling mode from the motor mode to the engine mode is made, and wherein the control system is configured to determine the driving force change rate such that the driving force change rate becomes greater as the amount of the operation of the accelerator at the third timing becomes greater.

2. The vehicle control apparatus according to claim 1, wherein the third driving force is set to be equal to a driving force that is obtainable when the electric motor is controlled with an upper-limit torque.

3. A vehicle control apparatus to be applied to a hybrid vehicle, the vehicle control apparatus comprising:

an electric motor coupled to one or both of a first wheel and a second wheel of the vehicle;

an engine coupled to one or both of the first wheel and the second wheel via a power transmission path;

a clutch mechanism provided on the power transmission path;

a torque converter provided on the power transmission path, wherein the torque converter is disposed between the engine and the clutch mechanism; and circuitry configured to control the electric motor, the engine, and the clutch mechanism, wherein the circuitry is configured to:

switch a traveling mode of the hybrid vehicle between a motor mode, in which the electric motor is driven while the clutch mechanism is disengaged, and an engine mode, in which at least the engine is driven while the clutch mechanism is engaged;

determine a requested driving force based on an amount of an operation of an accelerator of the hybrid vehicle;

determine a threshold for comparison with the requested driving force based on a vehicle speed of the vehicle;

when the traveling mode of the hybrid vehicle is the motor mode and the requested driving force is a first driving force that is equal to or less than the threshold, control the electric motor to output the first driving force;

in response to an increase in the requested driving force in the motor mode, from the first driving force to a second driving force, determine to switch the traveling mode from the motor mode to the engine mode, the second driving force being greater than the threshold;

in response to determining to switch the traveling mode from the motor mode to the engine mode, start execution of (i) a first control to cause the electric motor to output a third driving force that is greater than the threshold and smaller than the second driving force, (ii) a second control to start the engine, and (iii) a third control to engage the clutch mechanism that is released;

after starting execution of the second control, determine whether starting of the engine is completed based on a rotational speed of the engine;

after starting execution of the third control, determine whether engagement of the clutch mechanism is completed based on a difference between a rotational speed of an input shaft of the clutch mechanism and a rotational speed of an output shaft of the clutch mechanism;

in response to (i) determining that the starting of the engine is completed and (ii) determining that the engagement of the clutch mechanism is completed, determine whether a delay time has elapsed from a first timing at which (i) the determining that the starting of the engine is completed and (ii) the determining that the engagement of the clutch mechanism is completed are made;

maintain execution of the first control from starting execution of the first control until a second timing at which determining that the delay time has elapsed from the first timing is made;

after the second timing, terminate the first control and start execution of a fourth control to control the electric motor and the engine such that a combined driving force that is a sum of a driving force output by the electric motor and a driving force output by the engine increases toward the second driving force at a predetermined increase rate; and terminate the fourth control and start execution of a fifth control to control the electric motor and the engine such that the combined driving force follows the requested driving force, wherein the circuitry is configured to determine the delay time such that the delay time becomes shorter as the amount of the operation of the accelerator at a third timing becomes larger, the third timing being a timing at which the determining to switch the traveling mode from the motor mode to the engine mode is made, and wherein the circuitry is configured to determine the predetermined increase rate such that the predetermined increase rate becomes larger as the amount of the operation of the accelerator at the third timing becomes larger.

\* \* \* \* \*